(12) United States Patent
Yeghiayan et al.

(10) Patent No.: US 7,823,500 B2
(45) Date of Patent: Nov. 2, 2010

(54) COMPACT GRINDER

(76) Inventors: Arra David Yeghiayan, 16 Washington Rd., Windham, NH (US) 03087; Douglas M. Gaus, 9037 W. Beachside La., Boise, ID (US) 83714

( * ) Notice: Subject to any disclaimer, the term of this patent is extended or adjusted under 35 U.S.C. 154(b) by 917 days.

(21) Appl. No.: 11/508,733

(22) Filed: Aug. 22, 2006

(65) Prior Publication Data

US 2007/0051838 A1    Mar. 8, 2007

Related U.S. Application Data

(60) Provisional application No. 60/710,235, filed on Aug. 22, 2005.

(51) Int. Cl.
*A47J 31/42* (2006.01)
*A47J 31/44* (2006.01)
*B02C 17/02* (2006.01)

(52) U.S. Cl. ............................. 99/286; 99/290; 241/83

(58) Field of Classification Search ........... 99/279–323, 99/509–513, 495, 275, 485; 425/276–286; 241/37.5, 83–92, 15, 21, 194
See application file for complete search history.

(56) References Cited

U.S. PATENT DOCUMENTS

| | | | | |
|---|---|---|---|---|
| 1,828,143 A | * | 10/1931 | Hobbs et al. | 241/18 |
| 2,828,087 A | * | 3/1958 | Knoedler | 241/162 |
| 3,189,287 A | * | 6/1965 | Byberg | 241/275 |
| 4,721,449 A | * | 1/1988 | Alberts | 425/187 |
| 5,186,399 A | * | 2/1993 | Knepler et al. | 241/34 |
| 6,416,309 B1 | * | 7/2002 | Michlitsch et al. | 425/187 |
| 7,128,557 B2 | * | 10/2006 | Horng | 425/286 |
| 2006/0157602 A1 | * | 7/2006 | Wang | 241/152.2 |

FOREIGN PATENT DOCUMENTS

GB     2435609 A  *  9/2007

* cited by examiner

*Primary Examiner*—Tu B Hoang
*Assistant Examiner*—Lindsey C Teaters

(57) ABSTRACT

This application describes a compact grinder that allows scooping particulate material to be ground (such as coffee beans), grinding the material to a controlled and consistent size, while concurrently emitting the stream of grinds directly into a receptacle, such as a coffee filter or the receptacle for an automatic coffee maker. The scoop portion of the grinder is sized to fit into the standard bags used for whole bean packaging, eliminating the need for a separate storage vessel or the need to pour the beans from their bag into the grinder. It has calibrated markings within the scoop, eliminating the need for a separate measuring device.

12 Claims, 8 Drawing Sheets

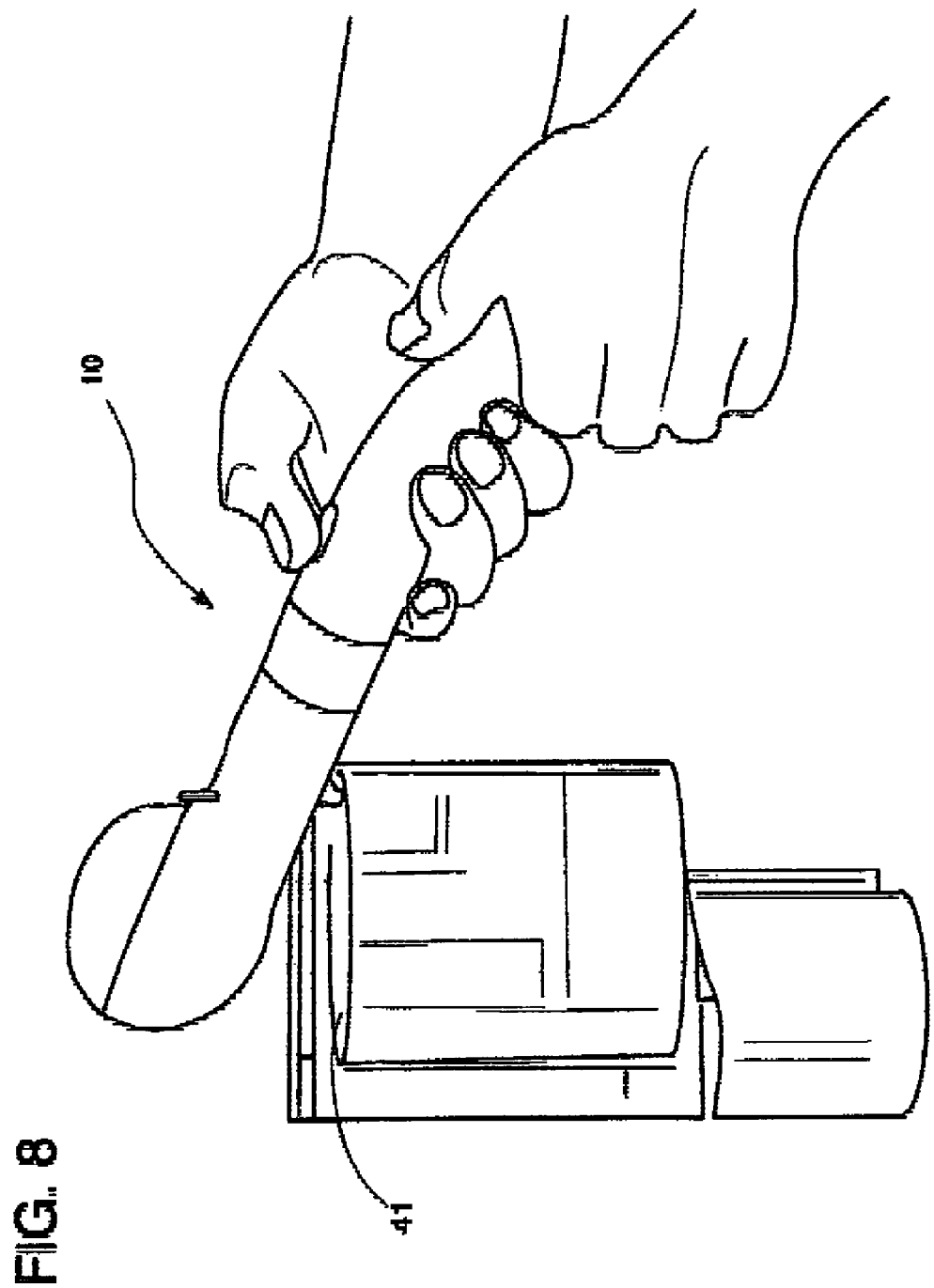

COMPACT GRINDER

CROSS-REFERENCE TO RELATED PATENT APPLICATIONS

This application claims the benefit of Provisional Patent Application Ser. No. 60/710,235, filed Aug. 22, 2005, the disclosure of which is incorporated in its entirety hereinto by reference.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION (1) Field of the Invention

This application is directed to the general field of devices for grinding particulate matter and more specifically to a compact grinder that allows scooping a particulate material to be ground (such as coffee beans), grinding the material to a controlled and consistent size, while concurrently emitting the stream of grinds directly into a receptacle, such as a coffee filter or the receptacle for an automatic coffee maker, all of the above steps occurring in as a quasi continuous operation under the manual control of the user.

(2) Description of Related Art including information disclosed under 37 CFR 1.97 and 1.98

Conventional coffee grinders may comprise blade mills which incorporate a two-wing blade rotating at high speed. The blade chops the beans into randomly sized grinds, varying from chunk size to dust size. They are quick and simple but usually loud.

BRIEF SUMMARY OF THE INVENTION

The principle object of the invention is to provide a compact grinder usable for grinding coffee beans (and other appropriate particulate material) to a preselected size in a manner such that the beans may be scooped from a standard storage bag by the scoop portion of the grinder then, concurrently ground and loaded into the receptacle of a coffee brewer (or other suitable container) for subsequent brewing.

These and other objects of the invention are achieved in a combination scoop/grinder comprising a compact grinder that allows scooping particulate material to be ground (such as coffee beans), grinding the material to a controlled and consistent size, while concurrently emitting the stream of grinds directly into a receptacle, such as a coffee filter or the receptacle for an automatic coffee maker or brewer. The scoop portion of the grinder is sized to fit into the standard bags used for whole bean packaging, eliminating the need for a separate storage vessel or the need to pour the beans from their bag into the grinder. It has calibrated markings within the scoop, eliminating the need for a separate measuring device.

BRIEF DESCRIPTION OF THE SEVERAL VIEWS OF THE DRAWINGS

A complete understanding of the present invention will be had by reference to the accompanying drawings, when considered in conjunction with the subsequent, detailed description, in which:

FIG. 8 is an illustrative perspective view of a user of the scoop/grinder of the invention in the deposition grinding/deposition step of the process with the lid of the scoop fully closed and the user holding the outlet of the grinder over the receptacle portion of the coffee brewer prior to starting the grinding operation and the depositing the grinds into the brewer.

DETAILED DESCRIPTION OF THE INVENTION

The device of the invention is intended primarily to measure and grind coffee, but may also be used to grind items such as peppercorns, nuts, salt, seeds and non-food items. Some grinders operate as an intermediary step in a rather continuous or quasi continuous process in which particulate material (which is stored in a container) is first measured in the grinder or in a separate container as part of the process of loading the grinder. In the case of a separate measuring step outside the grinder, the measured particulate matter is then loaded into the grinder. Rather immediately thereafter, the particulate matter is measured in or the pre-measured particulate is deposited into the grinder prior or continuous with the grinding process. In making coffee, many prefer the taste of coffee prepared from whole beans which are ground contemporaneously or immediately prior to the coffee preparation step. The device of the invention is particularly appropriate for the above process as it applies to the preparation of whole coffee beans into liquid coffee for drinking.

This application describes a compact grinder that allows scooping particulate material to be ground (such as coffee beans), grinding the material to a controlled and consistent size, while concurrently emitting the stream of grinds directly into a receptacle, such as a coffee filter or the receptacle for an automatic coffee maker. The scoop portion of the grinder is sized to fit into the standard bags used for whole bean packaging, eliminating the need for a separate storage vessel or the need to pour the beans from their bag into the grinder. It has calibrated markings within the scoop, eliminating the need for a separate measuring device. Burr mills are normally hand-powered and are designed to produce grinds of a pre-selected size. It is an established principle that consistently sized grinds are preferable for making a good tasting cup of coffee. This is because fine grinds can ruin a cup of coffee by passing through the filter during the brewing process causing bitterness. In addition, burring grinders normally allow adjustment of the grind size for different coffee brewing processes, and the adjustment is accomplished by relative axial motion between the inner grinder cone and the outer housing.

Figure 1:
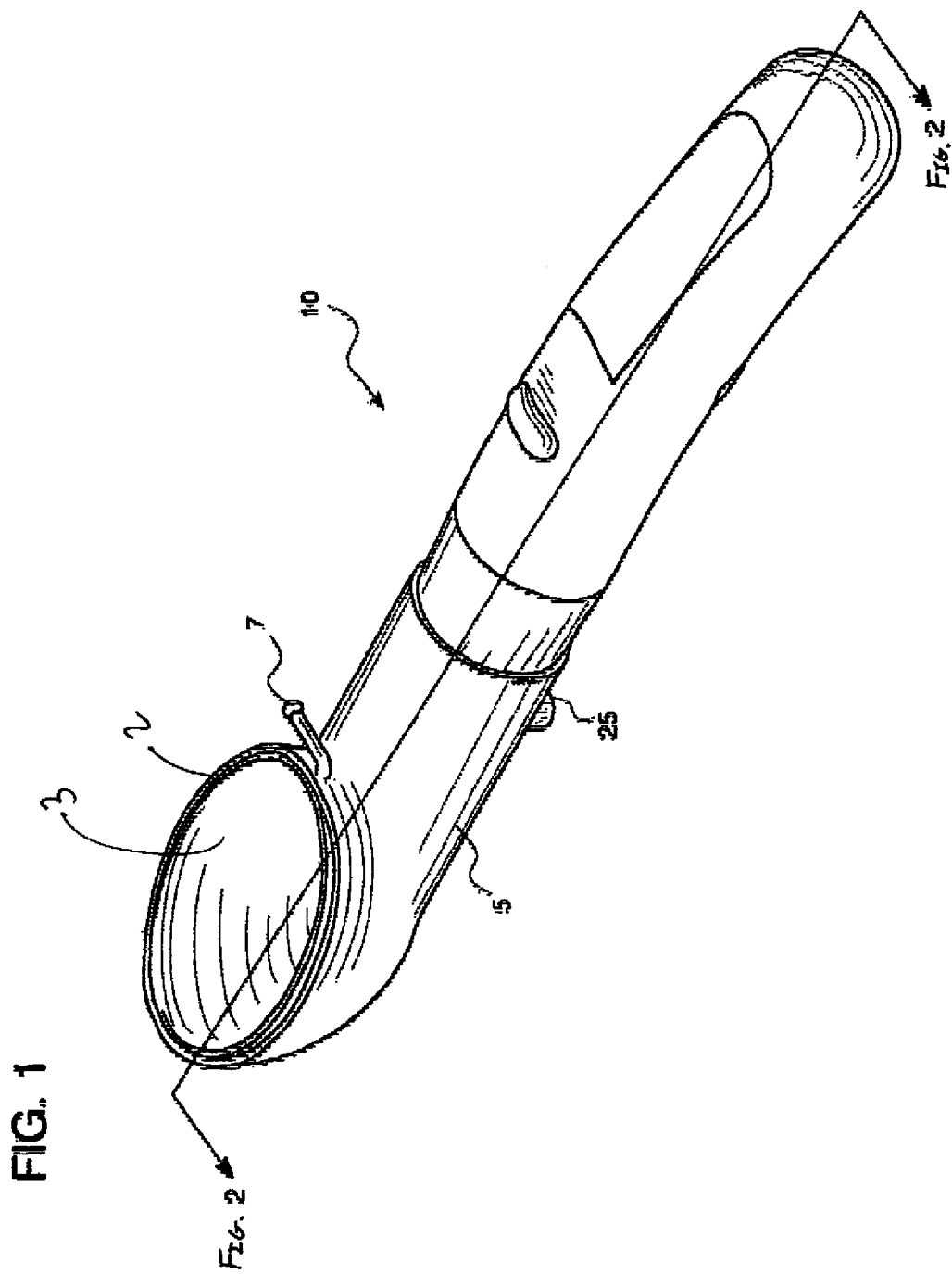
FIG. 1 is a upper right perspective view of the exterior of the compact grinder of the invention.

Based on the above, the burr mill is the preferred design for a coffee grinder, but either style may be used. Coffee beans are often transferred from the standard bag in which they are purchased into a more open storage container (i.e. canister), which facilitates use of a scoop to measure and transfer the beans. Additionally, both styles normally incorporate an attached receptacle to capture the grinds, and this receptacle is then removed to transfer the grinds to the coffee maker. In the case of blade grinders, the input hopper and output receptacle are sometimes the same, but in any case, must be well sealed to prevent dust from being expelled by the high-speed blade The combination scoop and grinder 10 of the invention initially will be described with reference to FIGS. 1 and 2 of the drawings. In FIG. 1 there is shown a scoop body 5 comprising a scoop body neck and a scoop body head 2. The scoop body head 2 is generally in the preferred shape of an oblate hemisphere, with the long axis thereof running parallel to the handle and the depth equal to the long radius. This shape allows it to reach into narrow openings, yet hold a greater volume than a hemisphere of the same width.

The scoop body head 2 incorporates an integral lid 3, which is similarly shaped as the scoop body head 2 but with a depth equal instead to the short radius thereof. This allows the scoop lid 3 to rotate fully within the scoop body head 2 so that it does not interfere during the scooping phase of the process, yet still seals it satisfactorily during grinding. Even if filled to heaping volume of beans, the volume of this assembly is always larger when closed than open, ensuring it will always close and that there is adequate looseness to properly feed the burr mill.

It should be noted that the scoop lid 3 is not technically necessary to the basic functioning of the device since the burr mill turns slowly and does not cause the unground beans to fly as in a rotating blade mill discussed above. Nonetheless, there is some motion and occasionally some of the partially ground beans may be ejected from the scoop body head 2 and the scoop lid 3 addresses this potential problem. In addition, the scoop lid 3 performs the important function of limiting the maximum intake volume and preventing an excessive amount of beans from traveling down the neck of the scoop into the burr mill. The inner surface of the head of the scoop has markings to indicate fill levels and for this reason, the scoop may be used solely as a measuring device, as well. In the case of coffee grinding, the scoop portion of the grinder is sized to fit into the standard coffee bags used for whole bean packaging, eliminating the need for a separate temporary storage vessel before grinding or the need to pour the beans from their bag into the grinder. It has calibrated markings within the scoop, eliminating the need for a separate measuring device.

Figure 2:
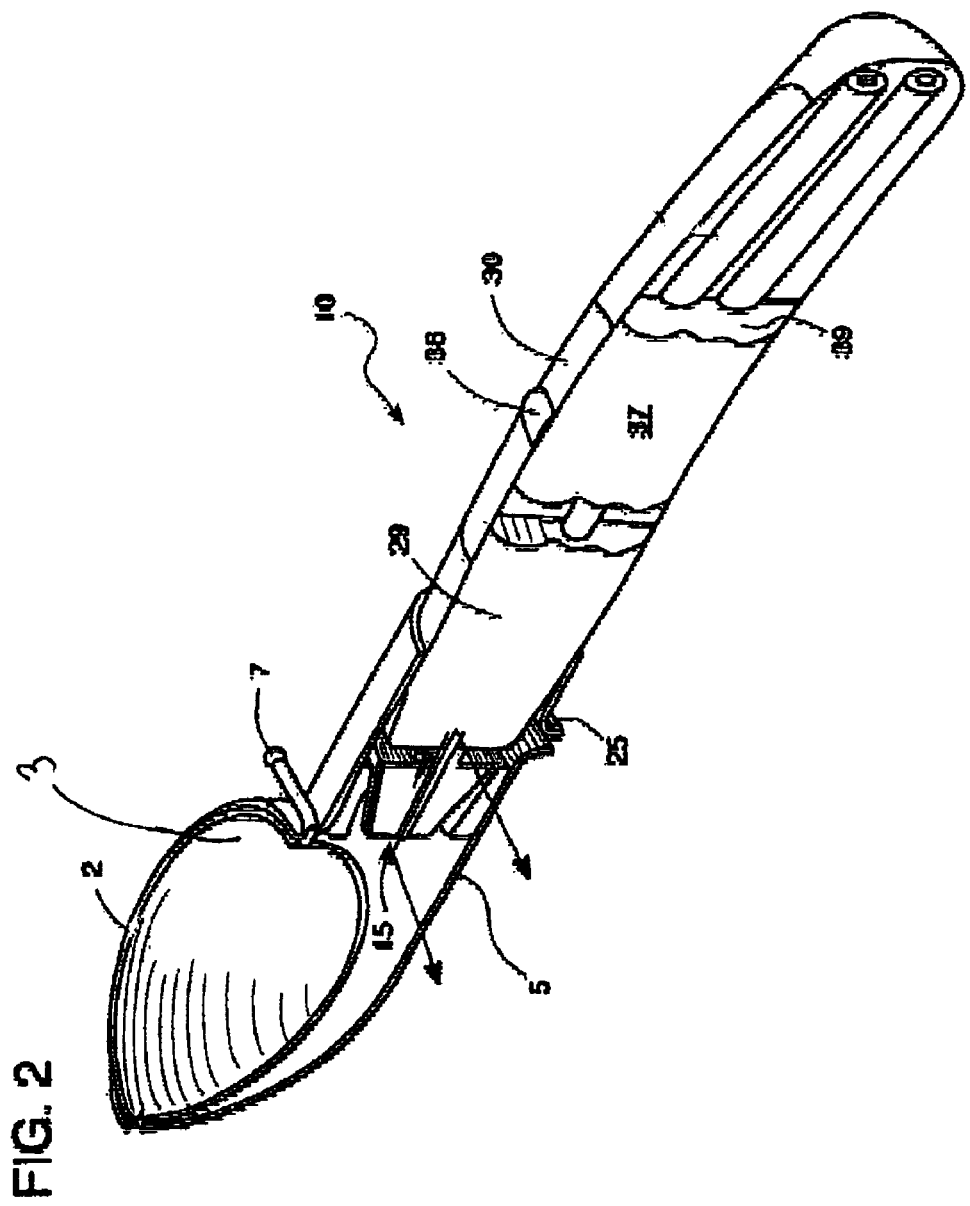
FIG. 2 is a perspective view oriented as in FIG. 1 but sectioned to show the interior components of the grinder.
Figure 3:
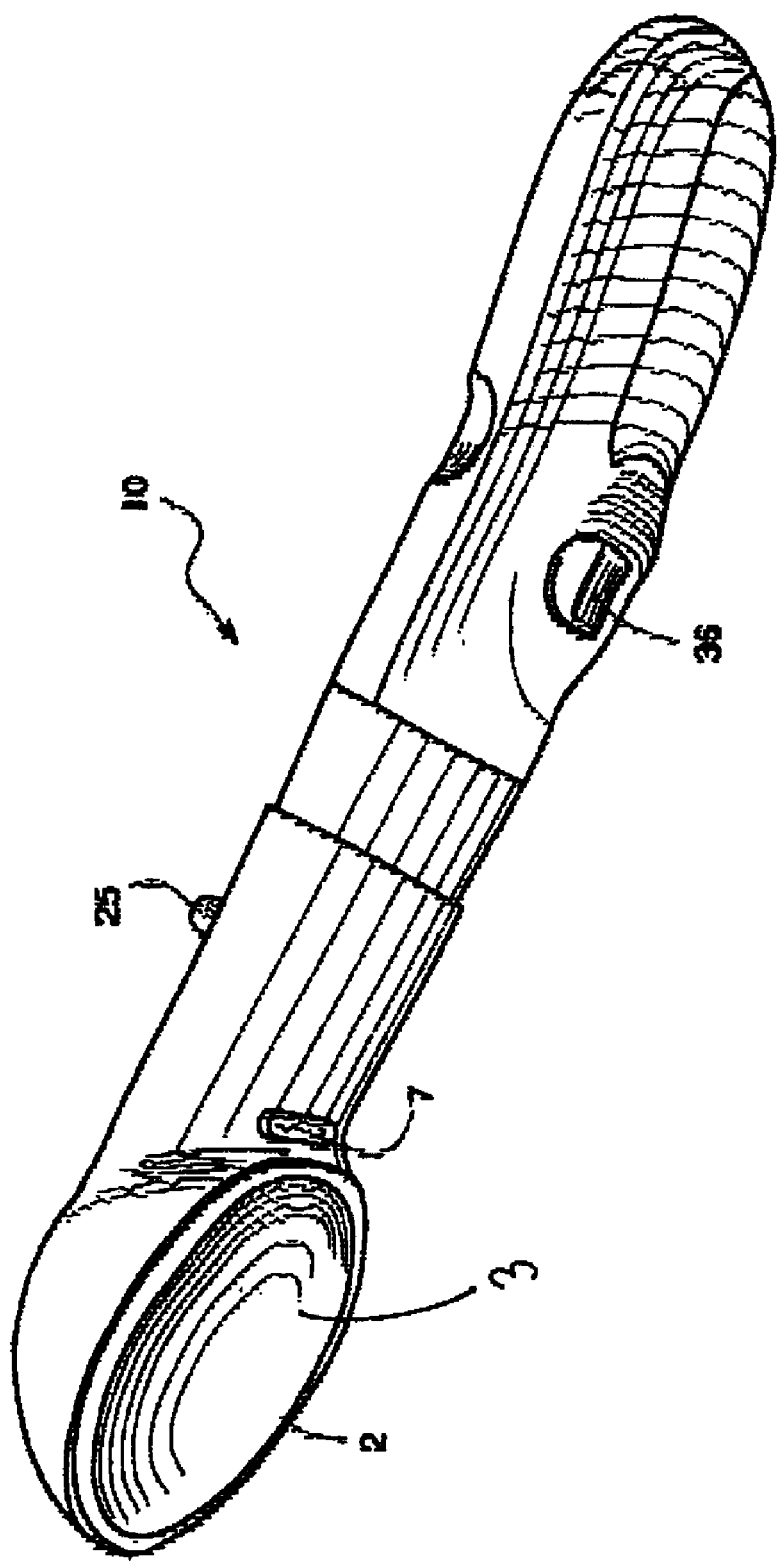
FIG. 3 is an illustrative, perspective view of the grinder in a position rotated downwardly and frontwardly about 90.degree. from the direction of FIG. 1.
Figure 4:
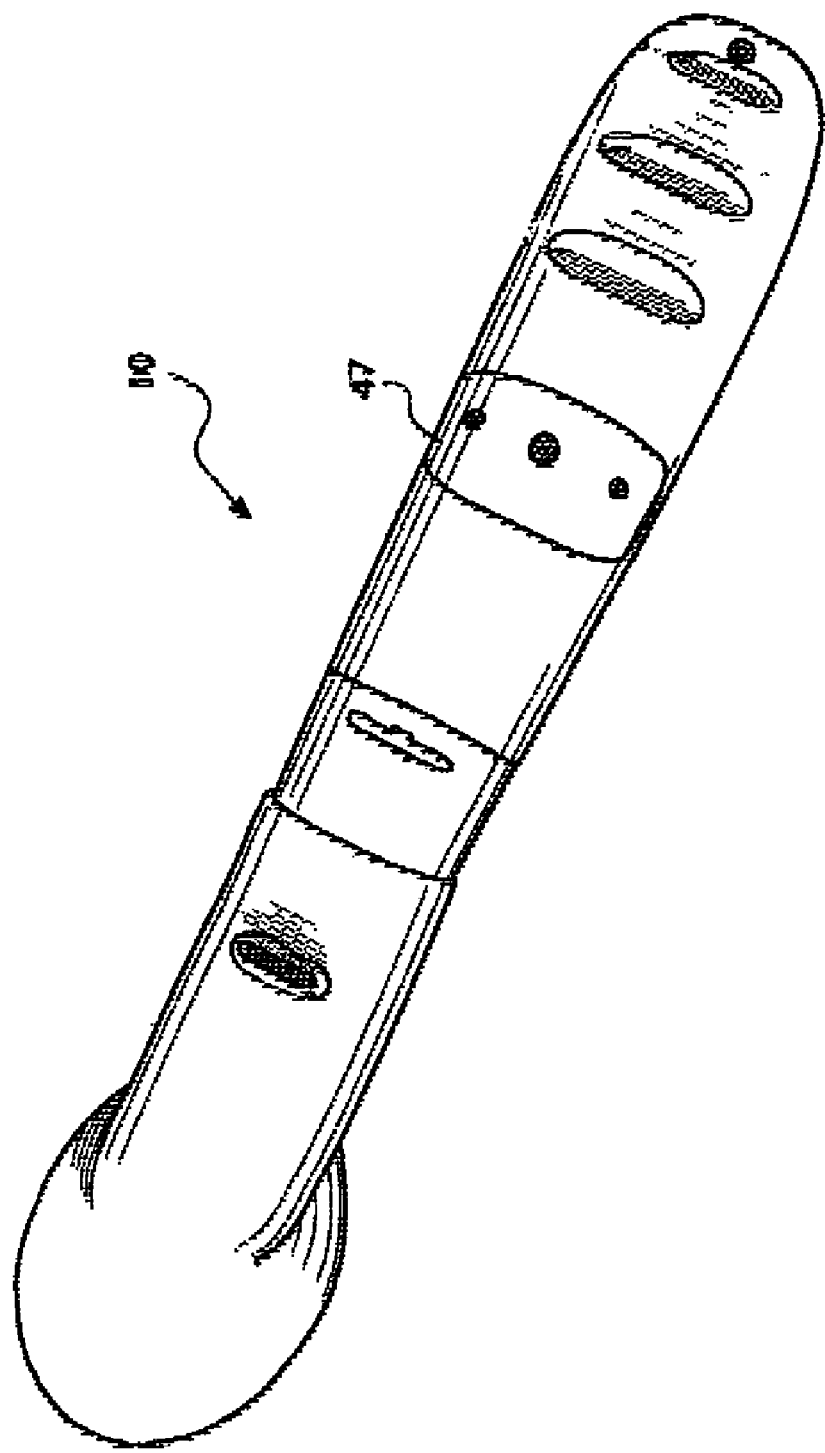
FIG. 4 is an illustrative perspective view of the grinder in a position rotated about 90.degree. rearwardly relative to the position shown in FIG. 1.
Figure 5:
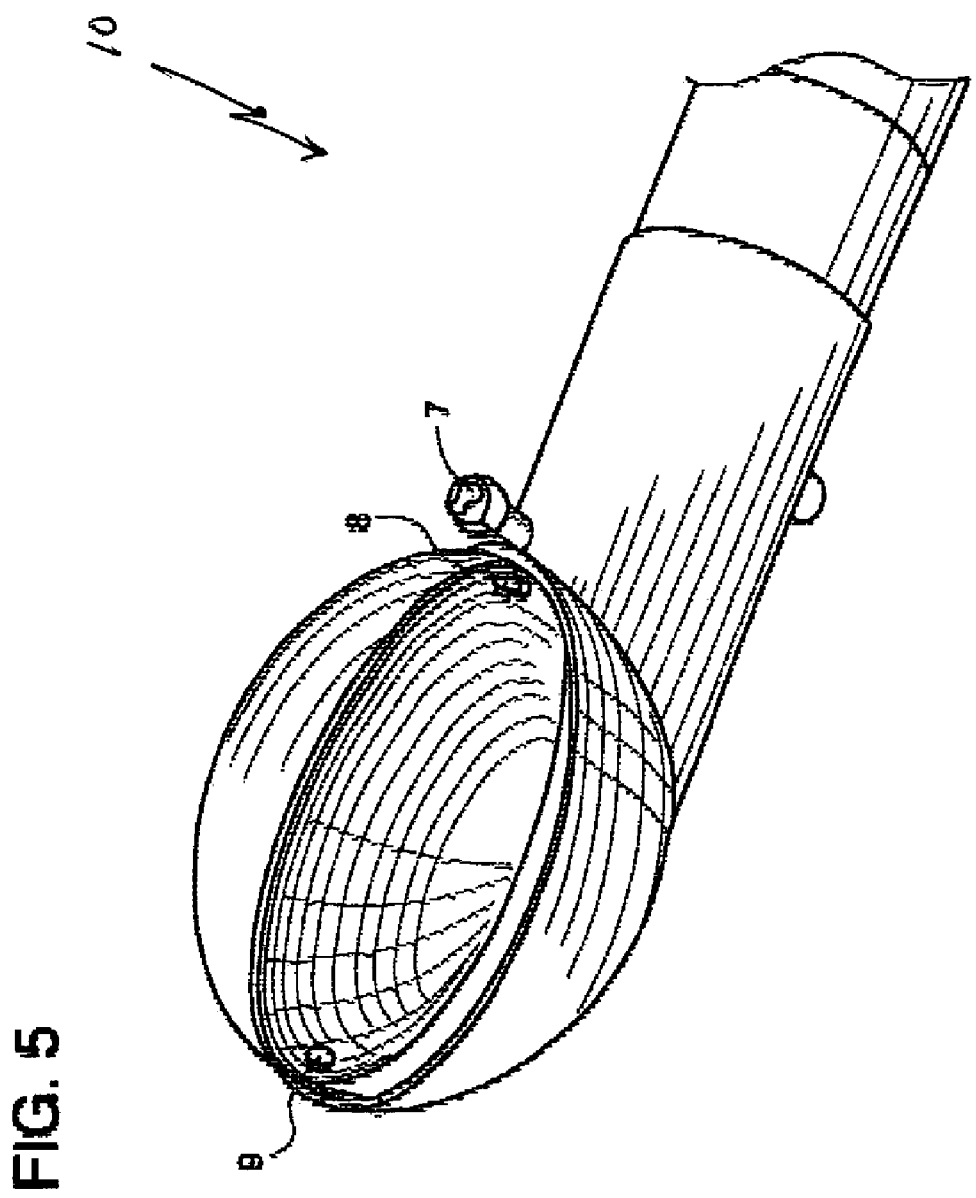
FIG. 5 is a perspective view of the scoop portion of the grinder with the rotatable lid rotated upwardly from its position in FIG. 1 and showing the support for the lid and the toggle mechanism for rotating the lid.

The scoop lid 3 is opened and closed by operation of the lever 7 which is held in place on the scoop body head 2 of the scoop by means of a screw 8 supported on one side of the scoop body head 2 of the scoop and the pivot pin 9 mounted through in the opposite side of the scoop body head 2. This is best illustrated in FIG. 5. This allows the lid to be moved 180.degree. from a fully open position of the scoop, shown in FIG. 2, to a fully closed position (not shown) by movement of the lever 7 from a first extreme position abutting the body of the handle, as shown in FIGS. 1, 2, to a second position at the other extreme rotation of the lever, not shown. While the design shown in the drawing is suitable for thumb actuation, other actuation methods may be easily substituted allowing ideally single-handed operation of the lid.

Figure 6:
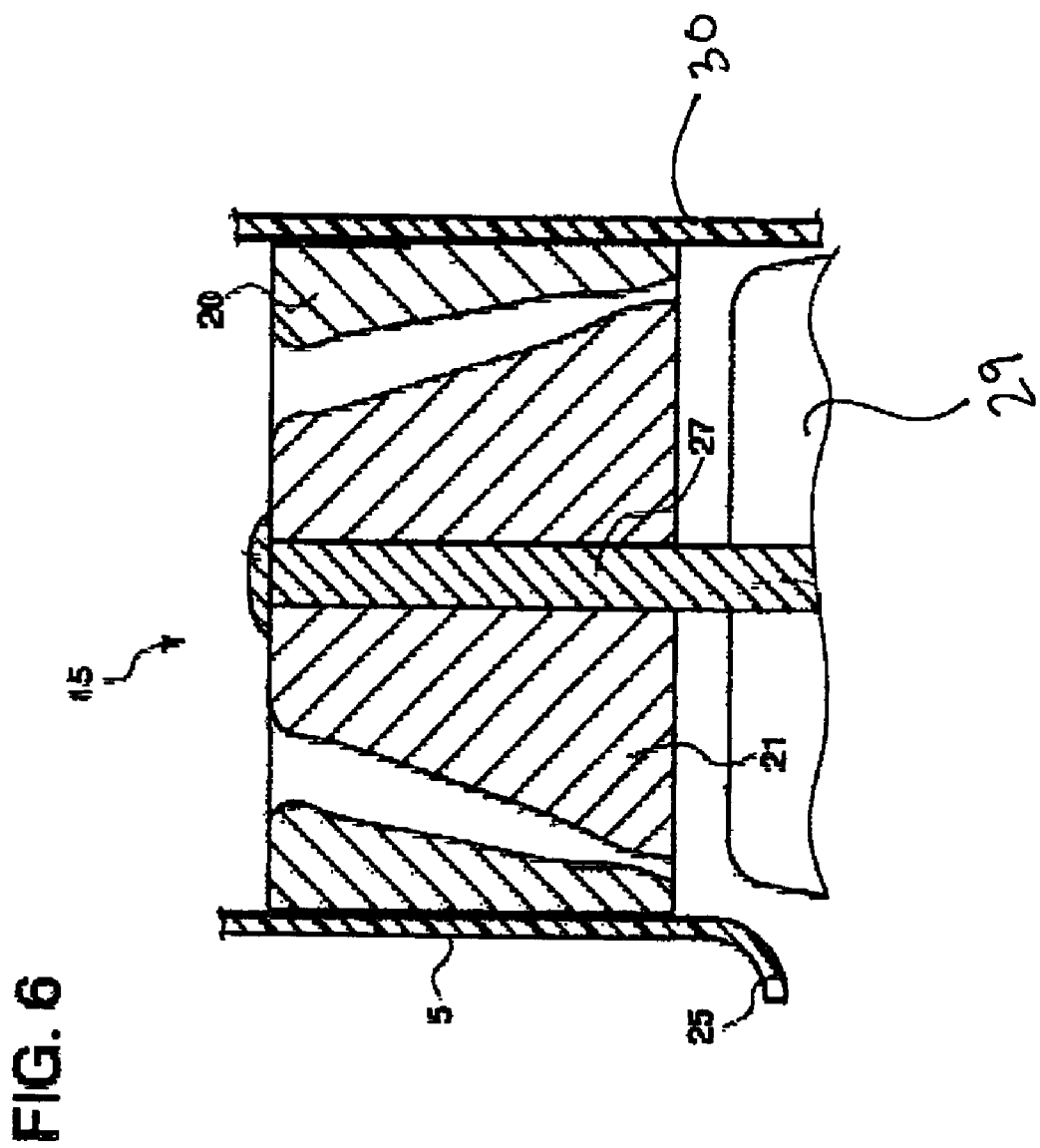
FIG. 6 is a sectional view of the burr mill components of the grinder of the invention.

The burr mill assembly 15, which is conventional for use in grinding coffee and pepper, will now be described with regard to FIGS. 2 and 6. It comprises an outer cone 20 and an inner cone 21. The inner cone 21 is mounted on the nose of an output shaft 27 of a motor 29 housed in an outer housing 30 and may be removed for cleaning. For this purpose, the outer housing 30 is mounted to the scoop body in such a manner that its axial position is adjustable relative to the inner cone 21, allowing adjustment of the grind size. The adjustment may be accomplished by rotating a captive collar (not shown) on the scoop body neck. The inner diameter of the collar and the outer diameter of the grinder outer housing may be engaged by threads, and rotation of housing relative to the body may be accomplished by splines, allowing axial adjustment by rotating the collar.

The ground particulate in the head area of the scoop proceeds into and through the burr grinder assembly 15 and exits the combination scoop/grinder 10 through an outlet 25. The outlet 25 is arranged with respect to the grinder 10 such that gravity carries the grinds from the burr mill through the outlet and into a waiting receptacle such as a coffee filter or an input basket of a coffee brewer, see FIG. 8. The outlet 25 may have a cover (not shown) to prevent grinds still held within the device from falling out when the device is not in use. The cover may be actuated between open and closed positions in response to movement of the lid lever 7 between its closed and open positions, respectively. The outlet 25 is sized, shaped and located so that grinds are not trapped and gravity allows them to flow easily.

The handle body 33 is formed into a battery compartment 39 which houses chargeable batteries 37, an electric motor 29 and any necessary reduction transmission gears (not shown), a preferred orientation for the later-mentioned parts being shown in FIG. 2. A power switch 36 is located so that the open lid, close lid, grind/deposit sequence can be performed by the user in a fluid, single-handed and quasi continuous motion. The scoop/grinder 10 may be arranged within the housing to be charged inductively or through conventional electrical contacts. It may also be charged with a plug-in connector. Although the cordless version described here is preferred, the unit may be powered via a conventional cord plugged in a wall outlet as well. The position in the handle body 33 of the housing opposite the on-off power switch 36 is formed with a groove 47 to make the unit more stable and comfortable. In a similar manner, the user's fingers are provided appropriate spaces into the grove 47 which they interfit in order to improve the comfort and grip of the user.

Figure 7:
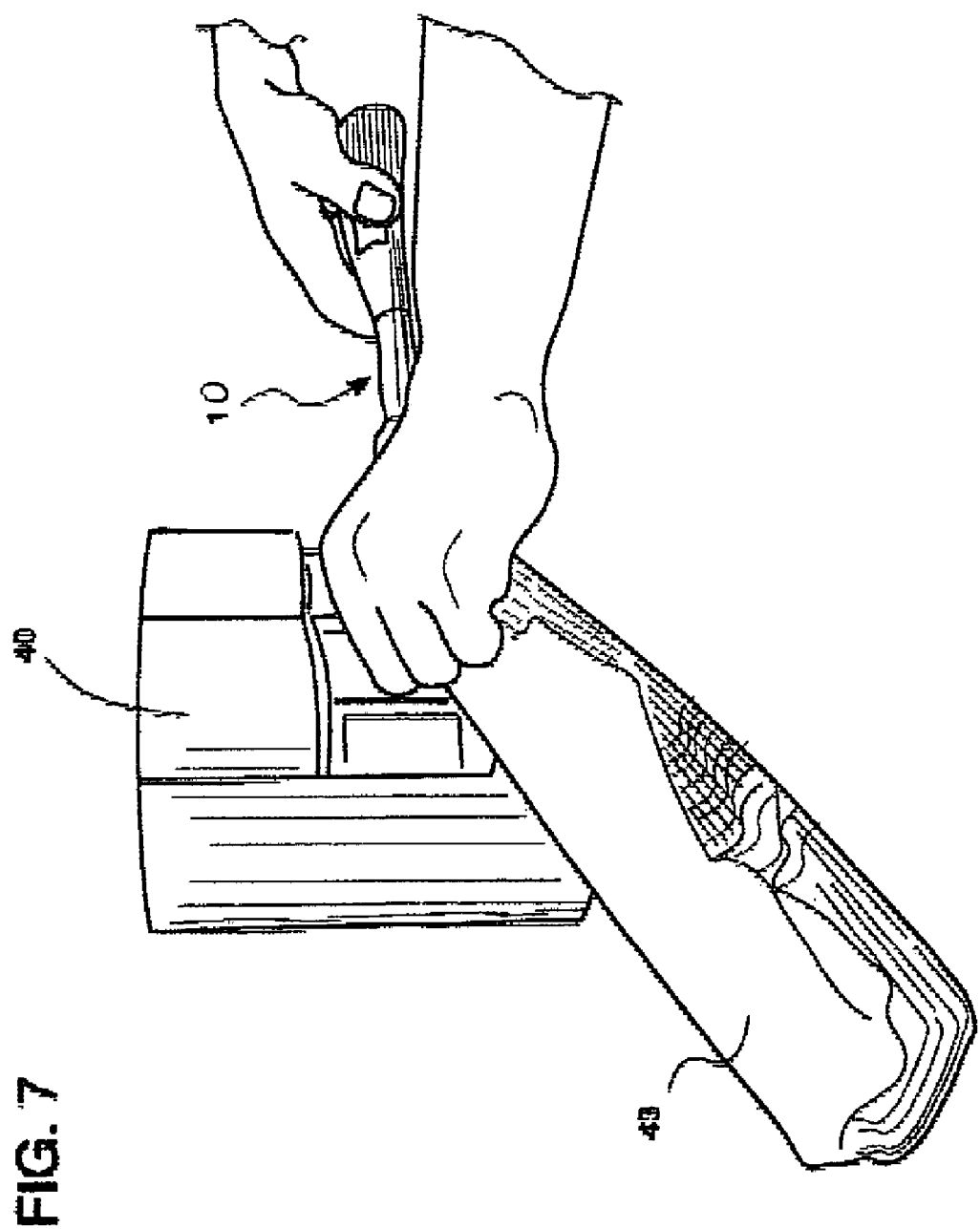
FIG. 7 is an illustrative perspective view of a user of the scoop/grinder of the invention inserting the scoop portion of the grinder into a bag coffee bean storage bag/container prior to starting the grinding/deposition step of the process.

In operation and as illustrated in FIGS. 7 and 8, the user of the combination scoop/grinder 10 of the invention moves the scoop lid to its open position using the lid lever 7. The user then inserts the scoop body head 2 into a container of coffee beans (or another appropriate material to be ground) 43 and scoops it from the container 43 while using markings on the inside of the scoop to facilitate measuring. The user then moves the scoop/grinder 10 to a position in which the outlet 25 is positioned directly over the receptacle 41 of the coffee brewer 40. The user then moves the lid lever 7 to its closed position (automatically opening the outlet cover) and pushes the on-off power switch 36 to turn on the grinder motor 29 and start the burr mill into operation to grind the particulate. The ground coffee beans or other particulate matter falls directly by gravity into the burr grinder assembly 15 where it is ground to the appropriate size. It then falls directly from the outlet 25 into the desired receptacle, such as a coffee brewer receptacle 41.

The preceding description has presented in detail an exemplary preferred embodiment of the invention and its application. Those skilled in the art will recognize that numerous alternatives encompassing many variations may readily be employed without departing from the scope of the present invention as set forth in the claims herein.

What is claimed is:

1. A grinder for reducing a particulate material size comprising:
    an elongated housing positioned as a handle, the elongated housing having a scoop at one end thereof for scooping and holding a quantity of particulate material to be ground;
    a neck extending from the scoop, situated within an interior portion of the elongate housing;
    a grinding mechanism for reducing the particulate material size of said quantity of particulate material, said mechanism having an input located proximate to the neck extending from the scoop, and output and being located with respect to said scoop so that said quantity of particulate material flows by gravity from said scoop through the neck and into said grinding mechanism;
    a lid rotatable within the scoop having an open position and a closed position; and
    a housing outlet proximate to the outlet of said grinder mechanism, whereby the quantity of particulate material loaded into said scoop may move continuously from the scoop, through the mechanism and out the housing outlet, wherein the quantity of particulate material loaded into said scoop is prevented from entering the housing outlet when the lid is in the open position.

2. The grinder recited in claim 1, wherein said grinding mechanism comprises a burr gear milling assembly.

3. The grinder recited in claim 2, wherein said housing has a generally cylindrical cross section in the area opposite said scoop.

4. The grinder recited in claim 1, wherein the lid rotatable within the scoop is pivotally mounted on a first and a second position of the scoop, wherein the first and second positions are opposing.

5. The grinder recited in claim 1, further comprising a lever situated to rotate the lid between the closed position to the open position.

6. The grinder recited in claim 1, wherein the lid limits the quantity of particulate material that moves from the scoop to the grinding mechanism.

7. The grinder recited in claim 1, wherein the lid seals the quantity of particulate material housed within the scoop from being ejected from the scoop during a grinding process.

8. The grinder recited in claim 1, further comprising a battery compartment formed within the elongated housing.

9. The grinder recited in claim 1, further comprising a housing outlet cover preventing the quantity of particulate material from falling out of the housing outlet.

10. The grinder recited in claim 9, wherein positioning the lid in a closed position opens the housing outlet cover.

11. The grinder recited in claim 1, wherein the quantity of particulate material to be ground comprises coffee beans.

12. The grinder recited in claim 1, wherein the quantity of particulate material to be ground comprises peppercorns.

* * * * *